United States Patent

[11] 3,593,462

[72] Inventor Paul A. Ryll
Haverhill, Mass.
[21] Appl. No. 809,846
[22] Filed Mar. 24, 1969
[45] Patented July 20, 1971
[73] Assignee Western Electric Company Incorporated
New York, N.Y.

[54] APPARATUS FOR ABRADING ARTICLES
6 Claims, 2 Drawing Figs.

[52] U.S. Cl. ........ 51/161
[51] Int. Cl. ........ B24b 5/18
[50] Field of Search ........ 51/149, 154, 161, 131, 118—120, 211, 217, 277, 283

[56] References Cited

UNITED STATES PATENTS

| | | | |
|---|---|---|---|
| 949,760 | 2/1910 | Flad | 51/211 |
| 1,284,283 | 11/1918 | Flad | 51/277 |
| 1,467,307 | 9/1923 | Clement et al. | 51/277 |
| 2,401,953 | 6/1946 | McCain | 51/161 |
| 2,668,397 | 2/1954 | Holzrichter et al. | 51/161 |
| 3,063,206 | 11/1962 | Meyerhoff et al. | 51/161 |
| 3,453,783 | 7/1969 | Queen | 51/131 X |

*Primary Examiner*—Othell M. Simpson
*Attorneys*—H. J. Winegar, R. P. Miller and S. Gundersen

ABSTRACT: Extremely thin quartz crystal plates are nested in toothed nesting members of still lesser thickness, each of which rests upon a different planetary gear of a planetary gearing assembly. The nesting members conform to the shape of the planetary gears and move with the planetary gears upon the operation of a drive motor. This movement causes the top faces of the nested crystal plates to be lapped against a bottom lapping surface of a nonrotary lapping plate. The top faces of the crystal plates, thus, are lapped into substantially exact parallelism with unaltered bottom faces of the crystal plates.

INVENTOR
P. A. RYLL

By [signature]
ATTORNEY

APPARATUS FOR ABRADING ARTICLES

BACKGROUND OF THE INVENTION

This invention relates to apparatus for abrading one or more articles and, more particularly, to apparatus for the precision lapping of very thin articles, such as quartz crystals.

In the manufacture of very thin articles, e.g., flat quartz crystal plates, it is often necessary that precise parallelism be achieved between the two opposite flat faces of a finished article. This will provide, in the case of quartz crystal plates, exactly identical predetermined angles of crystal orientation at both faces of each crystal plate so that certain desired electrical properties will be uniform throughout the crystal plate.

Various known apparatus for lapping thin quartz crystals commonly employ a pair of abrasive lapping plates in face-to-face relationship, each crystal contacting both lapping plates along opposite flat crystal faces while being displaced relative to the lapping plates so that both crystal faces are abraded simultaneously. Assuming that a crystal to be lapped has initially nonparallel opposite faces each providing a different angle of crystal orientation, lapping of the crystal with the known apparatus will tend to provide finished crystal plates with substantially parallel faces at a still different, and initially unknown, angle of crystal orientation. Thus, the apparatus cannot be utilized to provide finished crystal plates having precisely parallel opposite faces with a desired angle of crystal orientation.

In view of the situation described above, it is clear that, in the art of lapping crystals and in various analogous arts, it is advantageous to provide apparatus for establishing precisely parallel opposite surfaces in extremely thin articles while maintaining predetermined surface characteristics in one face of each article, e.g., by abrading only the other face of each article. Such apparatus should preferably provide for the simple truing of a relatively fixed reference surface into exact parallelism with an abrading surface such that, with the opposite faces of an article engaging the abrading and reference surfaces during a subsequent abrading operation, an article having the desired precise parallelism in opposite faces will be produced. The design of the apparatus should also allow for the abrading of articles having various sizes and configurations, with a relatively short down time required for changeover from abrading one type of article to abrading another type of article.

SUMMARY OF THE INVENTION

An object of the invention resides in new and improved apparatus for abrading one or more articles, such as apparatus for lapping very thin crystal plates to provide precisely parallel opposite surfaces to the plates.

The invention contemplates the use in such apparatus of a single lapping plate and at least one relatively thick article backing member relatively movable adjacent to but spaced from the plate with an extremely thin article nesting member located between the lapping plate and the backing member and movable with the backing member relative to the plate to lap or abrade a nested crystal plate or other article. The backing member and nesting member are preferably overlapped toothed members of identical shape, driven together by intermeshed teeth of a common drive gear to lap nested crystal plates against the lapping plate. The toothed backing member absorbs substantially all of the tangential load from the drive gear. Thus, the extremely thin, toothed nesting member may be driven by the drive gear together with the backing member with negligible deflection of the nesting member under the tangential driving load.

The nesting member is preferably easily removable from the apparatus and may be interchangeable with other nesting members so as to accommodate crystals of various sizes and shapes. Upon the removal of the nesting member, a top or bearing surface of the backing member may be trued into exact parallelism with a lapping surface of the lapping member. The nesting member may then be replaced upon the backing member. A first face of a crystal plate, which face has a known, desired angle of crystal orientation may next be placed against the trued bearing surface of the backing member as the crystal plate is nested in a nest provided by the replaced nesting member. The apparatus may thereupon be operated to lap against the single lapping plate a second, opposite face of the crystal plate so as to abrade the second face into exact parallelism with the first face. The desired angle of crystal orientation may, thus, be duplicated in both faces of the very thin crystal plate. This operation may, of course, be employed to lap plural crystal plates simultaneously in parallel, the crystals occupying nests in one or more nesting members on an equal number of backing members.

The use of removable nesting members supported by backing members not only provides interchangeability of the nesting members, but also avoids the difficult problems which would be inherent in machining nests into a single member functioning both to nest and to support the crystals. These problems would be compounded still further in attempting to true the bottom surfaces of the nests, which would constitute the bearing surfaces for supporting the crystals, into parallelism with the lapping plate.

DETAILED DESCRIPTION

Figure 1:
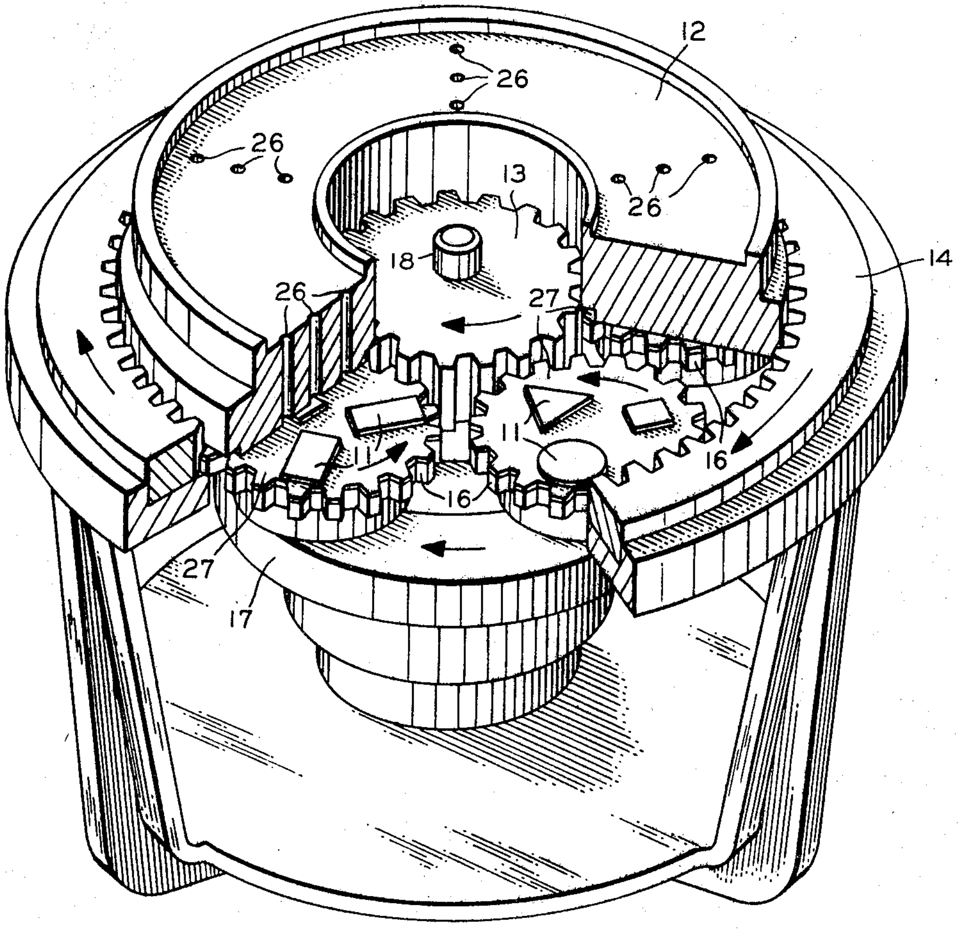
FIG. 1 is an isometric illustration, with parts broken away, depicting certain portions of apparatus constructed in accordance with the principles of the invention for lapping articles, such as thin, flat crystals, the apparatus including a lapping plate, a planetary gearing assembly and a number of thin, toothed crystal holders which are supported adjacent to the lapping plate by the planetary gears of the assembly.

Referring first to FIG. 1, there is shown a portion of apparatus constructed in accordance with the principles of the invention for reducing the thickness dimension of one or more thin flat articles 11, such as quartz crystal plates of rectangular or other shape. The crystal plates 11, which are initially quite thin, e.g., of 0.015 inch thickness, are to be lapped by the apparatus such that they are reduced in thickness to a still smaller dimension, typically about 0.010 inch.

Included in the apparatus are a nonrotatable lapping plate 12, a rotatable sun gear 13, a rotatable ring gear 14, and a number of identical planetary gears 16 for supporting the crystal plates 11. The planetary gears 16, which constitute backing members for the supported articles 11, are all mounted for rotation upon a spider 17 with the teeth of the planetary gears 16 enmeshed both with the teeth of the sun gear 13 and with the teeth of the ring gear 14. The sun gear 13 is mounted for rotation with a first drive shaft 18 (as in FIG. 2), while the ring gear 14 is mounted to rotate with a second drive shaft 19. Conventional drive mechanisms (not shown) are connected to rotate the drive shafts 18 and 19, preferably in the same direction at unequal angular velocities. The spider 17 is not restrained against rotary movement so that, when the sun and ring gears 13 and 14 are rotated, the planetary gears 16 may be driven by these rotating gears in a freewheeling condition. Thus, the planetary gears 16 will both rotate about their own axes and orbit the sun gear 13, causing the spider 17 to rotate about its vertical axis, as shown by the arrows in FIG. 1.

The lapping plate 12 is mounted to float freely on the top surfaces of the crystal plates 11. A lifting bracket 21 (see FIG. 2) includes a slot 22 through which there extends a lifting rod 23. The lifting rod 23 is associated with a handle 24 for raising the rod and, thus, the lapping plate 12 manually away from the crystal plates. The lifting rod 23 is guided at opposite ends by guides (not shown) so that the lapping plate 12 will be aligned correctly with respect to the gears 13, 14, 16 when lowered onto the crystal plates 11.

Figure 2:
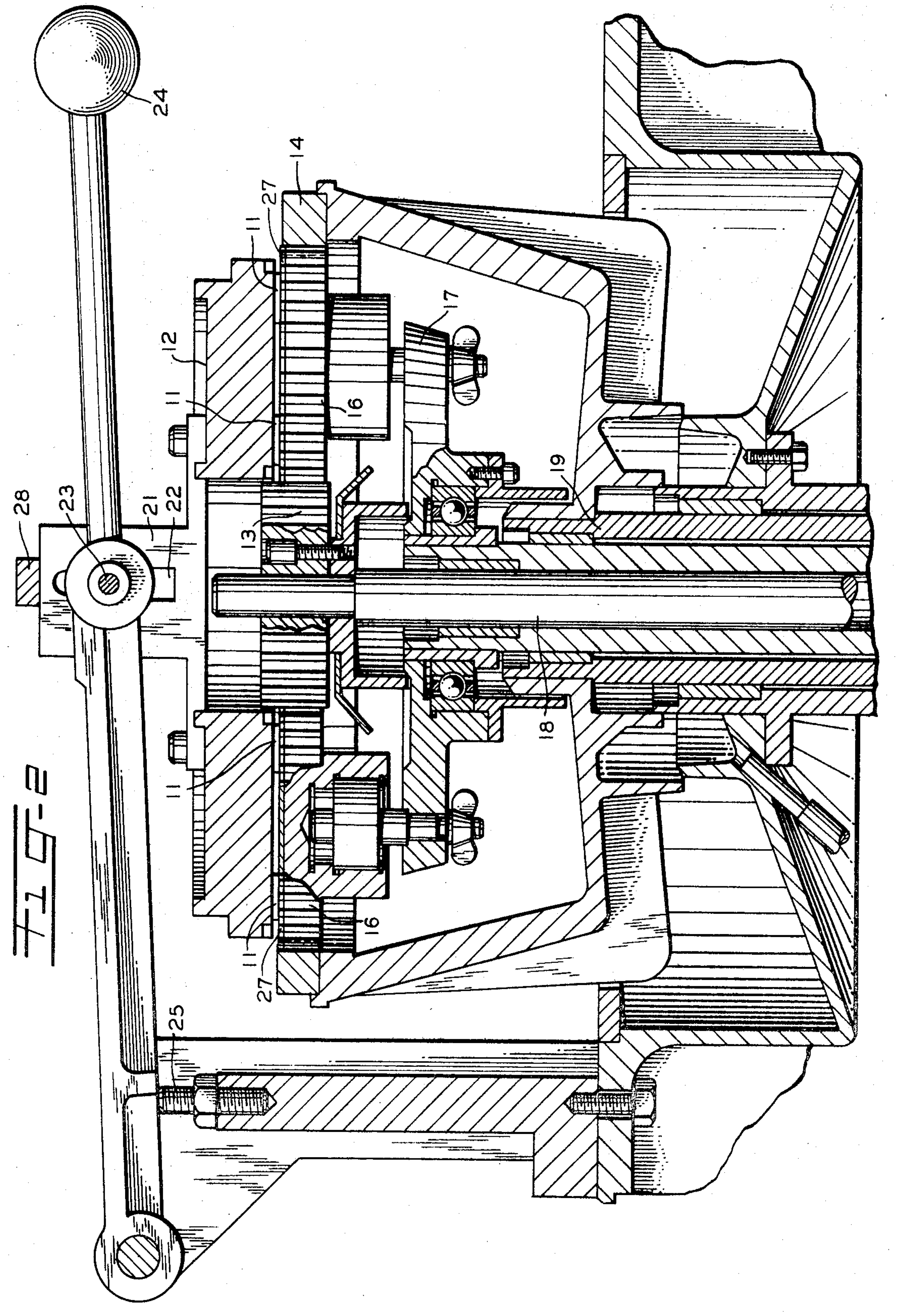
FIG. 2 is a vertical view, partially in cross section, of the apparatus showing a drive arrangement for operating the planetary gearing assembly of FIG. 1 and a mechanism for bringing the lapping plate into engagement with crystals nested in the crystal holders.

The lapping plate is shaped to enter, and substantially fill, an annular opening between top portions of the sun gear 13 and the ring gear 14 above the planetary gears 16. Thus, a bottom lapping surface of the lapping plate will rest continuously upon the top surfaces of the several crystal plates 11 as these crystal surfaces are lapped. The slot 22, shown slightly exaggerated in FIG. 2, is shaped to cooperate with a stop 25 such that the lifting rod 23 does not contact the walls of the slot during lapping. This avoids the presence of any sidewise force upon the lapping plate 12 or any binding of the lapping plate. A number of apertures 26 (FIG. 1) extend vertically through the lapping plate 12 and may be utilized to introduce into the apparatus beneath the lapping plate a slurry of abrasive particles suspended in oil for abrading the top surfaces of the crystal plates.

Removably positionable atop each of the planetary gears 16 is a toothed nesting member 27 having one or more nests configured to receive the crystal plates 11 one in each nest. The nesting members 27 have radii equal to the radii of the planetary gears 16 and have numbers of teeth equal to those on the planetary gears. Thus, as may be seen clearly in FIG. 1, each nesting member 27 exactly overlies the entire top or bearing surface of a planetary gear 16, exposing the bearing surface only beneath the several nests for receiving the quartz crystal plates 11.

Since the crystal plates 11 are to be lapped to an extremely thin vertical dimension, e.g., the 0.010 inch final thickness mentioned above, the nesting members 27 must necessarily be even more thin than this figure. The nesting members may be made of spring steel of from about 0.006 to about 0.008 inch thickness. The planetary gears 16 constitute backing members having top or bearing surfaces which provide both (1) flat reference surfaces for supporting the bottom faces of the crystal plates 11 and (2) supporting surfaces for maintaining the nesting members 27 substantially free of tangential driving load and in a flat array beneath the lapping plate 12 while rotating and orbiting the sun gear 13 with the planetary gears 16. During the lapping operation, the lapping plate 12 will float with its bottom lapping surface supported by, and lapping, the top surfaces of the traveling quartz crystal plates 11 above the top surfaces of the nesting members 27. The entire planetary gear and spider assembly, carrying the floating lapping plate 12, may be periodically moved slightly upwardly or downwardly with respect to the sun gear 13 and the ring gear 14, e.g., once each half hour by means of conventional mechanisms (not shown). The vertical dimensions of the teeth of the sun and ring gears and of the slot 22 are such as to permit these displacements. The repositioning of the planetary gears 16 and the nesting members 27 provided by the periodic displacements will act to minimize wear and prevent any undercutting of the gear teeth of the sun and ring gears.

In the operation of the apparatus of FIGS. 1 and 2, the lapping plate 12 is initially removed from the planetary gears 16 and the nesting members 27, e.g., by manual manipulation of the handle 24 (FIG. 2). The nesting members are then lifted from atop the planetary gears. The top or bearing surfaces of the planetary gears 16 may next be trued into exact parallelism with the bottom lapping surface of the lapping plate 12. The truing operation is performed by placing the lapping plate upon the planetary gears, introducing an abrasive slurry through the apertures 26 (FIG. 1) to cover the top surfaces of the planetary gears and then operating a drive motor (not shown) to rotate the drive shafts 18 and 19 (FIG. 2) and abrade the top surfaces of the planetary gears. Thereafter, the lapping plate is removed once again from the planetary gears 16 and the planetary gears are cleansed of all abrasive slurry. The truing operation need occur only once every several lapping operations, but is, of course, quite necessary in assuring precise parallelism of the opposite faces of a finished crystal plate.

The nesting members 27 may next be placed one on each of the planetary gears 16 and quartz crystal plates 11 may then be inserted into the nests. It may be noted in FIG. 1 that the nests are of a size and shape suited to accommodate the particular crystal plates 11 which are to be lapped by the apparatus. Interchangeable sets of nesting members may be utilized with the apparatus to permit lapping crystal plates of various sizes and shapes simultaneously, as in FIG. 1, or during successive lapping operations. The crystal plates 11 are placed into the nests such that a face of each crystal plate having a known and desired angle of crystal orientation faces downwardly in its nest and rests upon the top or bearing surface of a planetary gear 16. The crystal plates 11 substantially fill the nests.

With the crystal plates 11 positioned in the nests of the nesting members 27 and the latter each positioned on an associated planetary gear 16, the handle 24 may be manipulated to place the lapping plate 12 between the ring gear 14 and the sun gear 13 with the bottom lapping surface of the lapping plate resting upon the top faces of the various nested quartz crystal plates 11. Abrasive slurry may be introduced through the apertures 26 (FIG. 1) in the lapping plate 12 to cover the top surfaces of the nesting members 27 and of the crystal plates 11. The abrasive slurry is substantially sealed off from contact with the bottom surfaces of the nesting members and of the crystal plates by virtue of the fact that the crystal plates substantially fill the nests in the nesting members.

A drive motor (not shown) may next be operated to rotate the drive shafts 18 and 19 (FIG. 2), moving the planetary gears 16, the nesting members 27 and the quartz crystal plates 11 together relative to the bottom lapping surface of the nonrotary lapping plate 12. Thus, the top surfaces of the crystal plates will be lapped into substantially exact parallelism with the bottom surfaces of the crystal plates which rest upon the trued top surfaces of the planetary gears 16. In this manner, the desired angle of crystal orientation, initially present in the bottom surfaces, may be attained also in the top surfaces of the crystal plates.

Lapping may continue until a desired thickness or a desired frequency characteristic is attained for the quartz crystal plates. The frequency characteristic may be measured during lapping by a technique generally similar to that taught in copending application Ser. No. 766,735 of N. J. Mandonas and P. A. Ryll, filed Oct. 11, 1968. Thus, the nesting members 27 might be made of any suitable plastic or other dielectric material such that an electric circuit might be established from the lapping plate 12 through the nested crystal plates 11 and the drive mechanisms. By establishing a potential difference between the nonrotary lapping plate 12 and the grounded drive mechanisms, a signal may be detected from the piezoelectric quartz crystal plates 11 being lapped, which signal is indicative of the instant frequency characteristic of the crystal plates.

Alternatively, the thickness of the quartz crystal plates 11 might be measured during lapping by means of a displacement gauge (not shown) contacting a portion of the apparatus associated with the floating lapping plate 12, e.g., a crossbar 28 atop the lifting bracket 21. The crossbar 28 may also be constrained by vertical guide members (not shown) so as to define a fixed path of vertical travel for the lapping plate 12.

It is to be understood that the above-described apparatus is simply illustrative of one embodiment of the invention. In other embodiments, the planetary gears 16 might be biased upwardly to press nested crystal plates 11 against a fixed lapping plate rather than having the lapping plate floating upon the tops of the crystal plates, or the entire apparatus might be inverted such that floating planetary gears press the nested crystal plates downwardly against a lapping surface of a fixed lapping plate. Still other embodiments might be constructed with nonorbiting and/or nonrotating article nesting and backing members, the lapping plate being rotated or otherwise moved with respect to the nested articles. Many other modifications may be made in accordance with the disclosed principles of the invention.

What I claim is:

1. In apparatus for abrading an article:
means having an abrading surface for abrading the article;
a relatively thick article backing member mounted for movement parallel to the abrading surface while spaced therefrom by approximately the thickness of the article;
a relatively thin article nesting member mounted for movement parallel to the abrading surface and positioned in the space between the article backing member and the abrading surface, said article nesting member having less thickness than an article and being shaped to retain an article within said space; and
drive means coupled (1) to the article backing member and (2) to the article nesting member for moving said members in unison parallel to the abrading surface to abrade a retained article.

2. In apparatus for abrading an article:
a driven gear having a flat face;
means having an abrading surface spaced from said flat face of the driven gear by approximately the thickness of the article for abrading the article;
toothed article nesting means positioned within the space between said flat face of the driven gear and said abrading surface for retaining an article between the abrading surface and said flat face surface of the driven gear while the article is in contact with both of said surfaces; and
means having teeth engaging the teeth of both the driven gear and the article nesting means for moving the driven gear and the nesting means together relative to the abrading surface to abrade a retained article.

3. In article abrading apparatus which includes an abrading member and a toothed planetary member orbited about a toothed sun gear while holding the article against the abrading member to abrade the article, the improvement which comprises said toothed planetary member constituting two discrete elements, namely:
a relatively thick backing member having teeth engaging the teeth of the sun gear and being positioned to orbit the sun gear with a substantially flat surface of the backing member spaced from the abrading member by a relatively narrow gap for bearing against the article axially to hold the article in engagement with the abrading member within said gap; and
a relatively thin article nesting member of less thickness than said gap positioned within said gap and having an article nest extending axially therethrough, said article nesting member having teeth overlapping the teeth of the backing member to engage the teeth of the sun gear for restraining the article to orbit the sun gear with the backing member.

4. In apparatus for abrading a work face of a relatively thin article:
an abrading member;
a rotary drive gear having teeth;
a relatively thick driven gear having teeth and having a flat-surfaced face;
means for mounting the driven gear with the teeth of the driven gear enmeshed with the teeth of the drive gear and with said flat face of the driven gear located adjacent to, but spaced from, the abrading member by approximately the thickness of the article;
toothed article nesting means of still lesser thickness than the relatively thin article and positioned in the space between the abrading member and said flat face of the driven gear with the teeth of the article nesting means enmeshed with the teeth of the drive gear for retaining an article nested in said space, with said work face of the article engaging the abrading member and an opposite face of the article engaging said flat face of the drive gear, to move with the driven gear upon rotation of the drive gear; and
means for rotating the drive gear to move the nested article relative to the abrading member for abrading said work face of the article.

5. In apparatus for abrading an article, as set forth in claim 4:
at least one additional relatively thick driven gear;
at least one additional toothed article nesting means of lesser thickness than an article;
said drive gear acting as a sun gear, said mounting means mounting said driven gears arrayed circumferentially about the sun gear and enmeshed with the teeth of the sun gear to orbit the sun gear with like faces of the driven gears located adjacent to, but spaced from, the abrading member by approximately the thickness of an article, and with each driven gear having an associated one of the toothed article nesting means positioned in the space between the abrading member and said like face of the driven gear in an attitude such that the teeth of each article nesting means are enmeshed with the teeth of the sun gear; and
a ring gear mounted to surround the driven gears and having teeth enmeshed with the teeth of the driven gears and the teeth of each article nesting means, at least one of said sun gear and said ring gear being rotated by said rotating means and constituting said rotary drive gear.

6. Apparatus for abrading thin articles having a predetermined reference surface, comprising:
a stationary means having an abrading surface for abrading the articles;
a sun gear;
a ring gear mounted for rotation concentric with said sun gear;
a circular flat nesting member mounted for rotation by said sun and ring gears about its own axis and about the axis of said sun gear parallel to the abrading surface, said nesting member having a lesser thickness than the thickness of the articles and apertures formed therein for receiving and for retaining the articles;
drive means for rotating said sun gear and ring gear at different angular velocities for rotating said nesting member about its own axis and about the axis of said sun gear; and
a planetary gear mounted beneath said nesting member and having the same axis as said nesting member for rotation by said sun and ring gears in unison with said nesting member to absorb substantially all of the driving force and to support the reference surfaces of the articles.